US005784643A

United States Patent [19]

Shields

[11] Patent Number: 5,784,643
[45] Date of Patent: Jul. 21, 1998

[54] SYSTEM INCORPORATING PROGRAM FOR INTERCEPTING AND INTERPRETING OR ALTERING COMMANDS FOR GENERATING I/O ACTIVITY FOR ENABLING REAL-TIME USER FEEDBACK BY SENDING SUBSTITUTE CHARACTERS TO MODEM

[75] Inventor: Ian Beaumont Shields, Raleigh, N.C.

[73] Assignee: International Business Machines Corporation, Armonk, N.Y.

[21] Appl. No.: 623,496

[22] Filed: Mar. 28, 1996

[51] Int. Cl.[6] ............................ G06F 15/00; G06F 15/16
[52] U.S. Cl. ...................... 395/825; 395/200.6; 395/500; 395/707
[58] Field of Search ................................ 395/500, 200.6, 395/825, 707

[56] References Cited

U.S. PATENT DOCUMENTS

| 5,202,899 | 4/1993 | Walsh | 375/8 |
| 5,202,963 | 4/1993 | Zelley | 395/325 |
| 5,392,386 | 2/1995 | Chalas | 395/155 |
| 5,515,474 | 5/1996 | Deacon et al. | 395/2.1 |
| 5,537,548 | 7/1996 | Fin et al. | 395/200.04 |

Primary Examiner—Thomas C. Lee
Assistant Examiner—Rehana Perveen
Attorney, Agent, or Firm—Jeanine S. Ray-Yarletts

[57] ABSTRACT

A system for allowing application programs to be written that can communicate over a multitude of transmission media without requiring the application program to be rewritten or reconfigured. This system includes a hook program which resides between the application programs and the operating system upon which the application programs run. The hook program intercepts information targeted for the operating system and the transmission medium and transforms it into the desired format, ensuring that the appropriate content is contained in the transmission. This system also intercepts data being sent to the application programs from the operating system while allowing interrupts to be sent from the transmission medium to the application programs without being intercepted by the hook program.

15 Claims, 9 Drawing Sheets

Prior Art

SYSTEM INCORPORATING PROGRAM FOR INTERCEPTING AND INTERPRETING OR ALTERING COMMANDS FOR GENERATING I/O ACTIVITY FOR ENABLING REAL-TIME USER FEEDBACK BY SENDING SUBSTITUTE CHARACTERS TO MODEM

FIELD OF THE INVENTION

This invention deals with the use of modems in the growing complex environment of telephony. The transmission of voice and data over cellular transmission links, traditional land-lines, FM radio and/or satellite has become extremely important to all aspects of business. This invention allows computer software applications to control transmission of data over either cellular or land lines (Public Switched Telephone Networks or PSTNs) without the requirement of first determining what the transmission medium is.

BACKGROUND OF THE INVENTION

Software programs are used extensively to control the transmission of data into telephony systems. A modem is used to accomplish this task. The modem (which stands for MOdulator/DEModulator) communicates with the application program by way of the operating system to establish the desired connection to the telephony system. The application program sends a command to the operating system, which interprets the command and passes a new command which should achieve the desired result from the operating system to the modem. The modem typically converts the information being sent from digital signals to analog signals and performs actions on those signals before sending them into the telephony system. The modem also returns information from the telephony system to the operating system, which then returns the information to the application program. These functions require that the application program, the operating system and the modem all utilize a similar means of communication and each of them knows what the other expects. When the modem receives the commands (or key strokes), the characters which were sent to the modem from the application program are typically echoed to a display unit. This allows users who are monitoring the transactions to verify the correctness of the key strokes.

Originally, the applications used were designed to transmit data over traditional PSTN telephone lines. When the application desired to send data across the line, it would initialize the modem. The initialization process entailed sending information to the operating system describing what number was to be dialed, what the characteristics of the application were and other set-up type information. The operating system would then issue the appropriate commands to the modem. This method worked well when there was only one kind of transmission medium. The application could send the same information whenever it accessed a modem.

AS cellular communication became popular, this method of accessing a transmission medium became a problem. The information that must be sent to establish a cellular connection may be significantly different than the information required to establish a PSTN connection. This causes problems when the target transmission medium is not predetermined or guaranteed to remain the same. Duplicate applications (one targeted for PSTN transmission and one targeted for cellular transmission) could be written and the person executing the application would be required to know which transmission medium was to be used.

Alternatively, authors of applications programs could use a configuration set-up to allow the user to identify the type of transmission that would be used. While this eliminated the need for duplicate applications programs, it still required manual human intervention to enter the configuration options and to chose which configuration to use. In addition, each application program would not only store its own configuration information, but would have to replicate it for each type of connection. Examples of this implementation include the automatic insertion of a '9' for dialing outside a proprietary telephone network, the automatic insertion of the local area code if there are only 7 digits dialed, the insertion of the ATDT prior to the number to access a PSTN and use of a '*' code (e.g. *1234 to access special services).

An application program typically communicates with a modem to establish a connection using "hand-shaking" mechanisms. An overview of this hand-shaking process is described in FIG. 1. An application 101 initiates communication by sending commands to the operating system 110 which, in turn, sends commands to the modem 120 which will forward the appropriate signals to the telephony system 130. A typical transmission contains the application 101 sending data and commands 111 to the operating system 110. The operating system 110, in turn sends data and commands 112 to the modem 120 which will initiate the line setup. The modem 120 returns data and responses 113 to the operating system 110, which then returns data and responses 114 to the application. This series of events can occur multiple times during the initialization and set up phase of the communication process. Once the set up is complete, the modem can transmit 117 or receive 118 information from the telephony system 130. The modem will then, periodically, send polling or information strings 115 to the operating system 110, which will then send the information 116 to the application.

An example of the typical flows required to reset a modem are shown in FIG. 2. The application 101 sends an attention signal followed by a carriage return (ATZcr) 131 to the operating system 110. The operating system 110 then sends the ATZcr 132 to the modem 120. The modem 120 echoes the ATZcr 133 to the operating system 110, which echoes the information 134 to the application program 110. Once this information has been successfully transmitted and echoed, the modem 120 sends an acknowledgement. The acknowledgement consists of a carriage return/line feed indication (crlf), an indication that the reset was successful (OK) and another carriage return/line feed (crlf). This acknowledgement 135 is sent from the modem 120 to the operating system 110 which passes the information 136 on to the application program 101.

The strings for initialization and synchronization for a land-line modem are different than those for a cellular modem. For example, the timer settings, the modem specific timeouts and the initialization characters all differ. In order for the system to function correctly, the application must know what the transport mechanism is prior to initiating the set up for the communication.

OBJECTS OF THE INVENTION

The object of this invention is to allow application developers to write a single application that will be able to efficiently transmit information into any available telephony system and establish the connection appropriately without knowing, in advance, what the telephony system is. As will be obvious to one skilled in the art, this methodology is not limited to the existing telephony system of cellular or PSTN. It is applicable to any telephony system accessed using a modem or a similar device.

Another objective is to allow the proper information to be echoed back to the application in a timely manner.

Another objective is to transmit sufficient information to the modem to allow the interrupts to be generated in a timely manner without requiring every character to be sent on a character-by-character basis.

SUMMARY OF THE INVENTION

The present invention involves a 'hook' program which is inserted between the application program and the operating system. This hook program is capable of supporting both cellular and land-line communications connections and will allow the user to write generic applications to support both types of communication. Certain hardware may support interrogation by the hook program to determine the type of connection. Others will require the user to input the connection type into the hook program. As will be evident to one skilled in the art, the same methodology can be used on any transport mechanism and is not meant to be limited to cellular and PSTN communications connections.

DESCRIPTION OF THE PREFERRED EMBODIMENT

The preferred embodiment of this invention uses a program that is inserted between the application program and the operating system. This program will be referred to as the hook program. The hook program will intercept commands issued to the operating system that are meant to control the modem operations.

Figure 1:
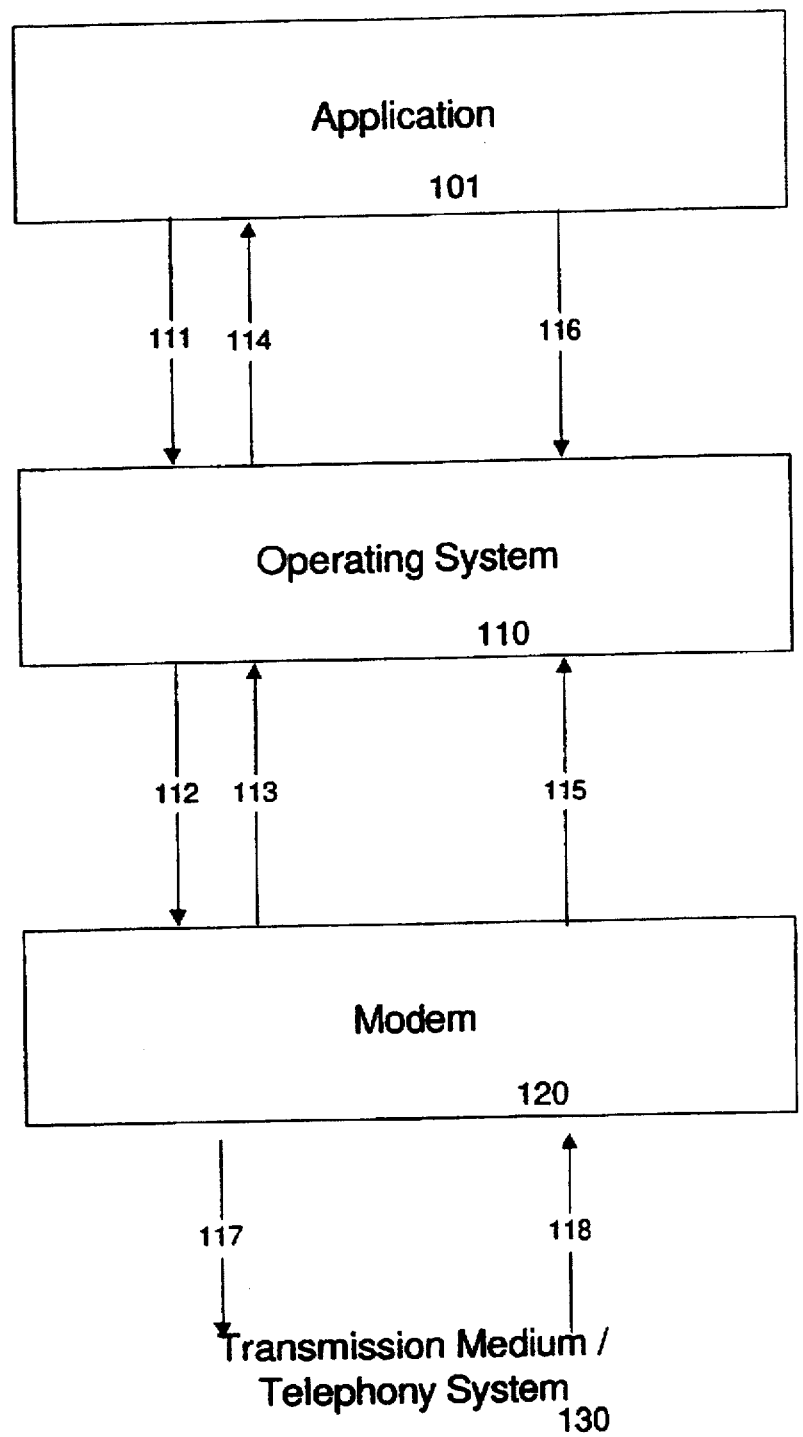
FIG. 1 depicts the hand-shaking mechanism between the application program and the modem by way of the operating system.
Figure 2:
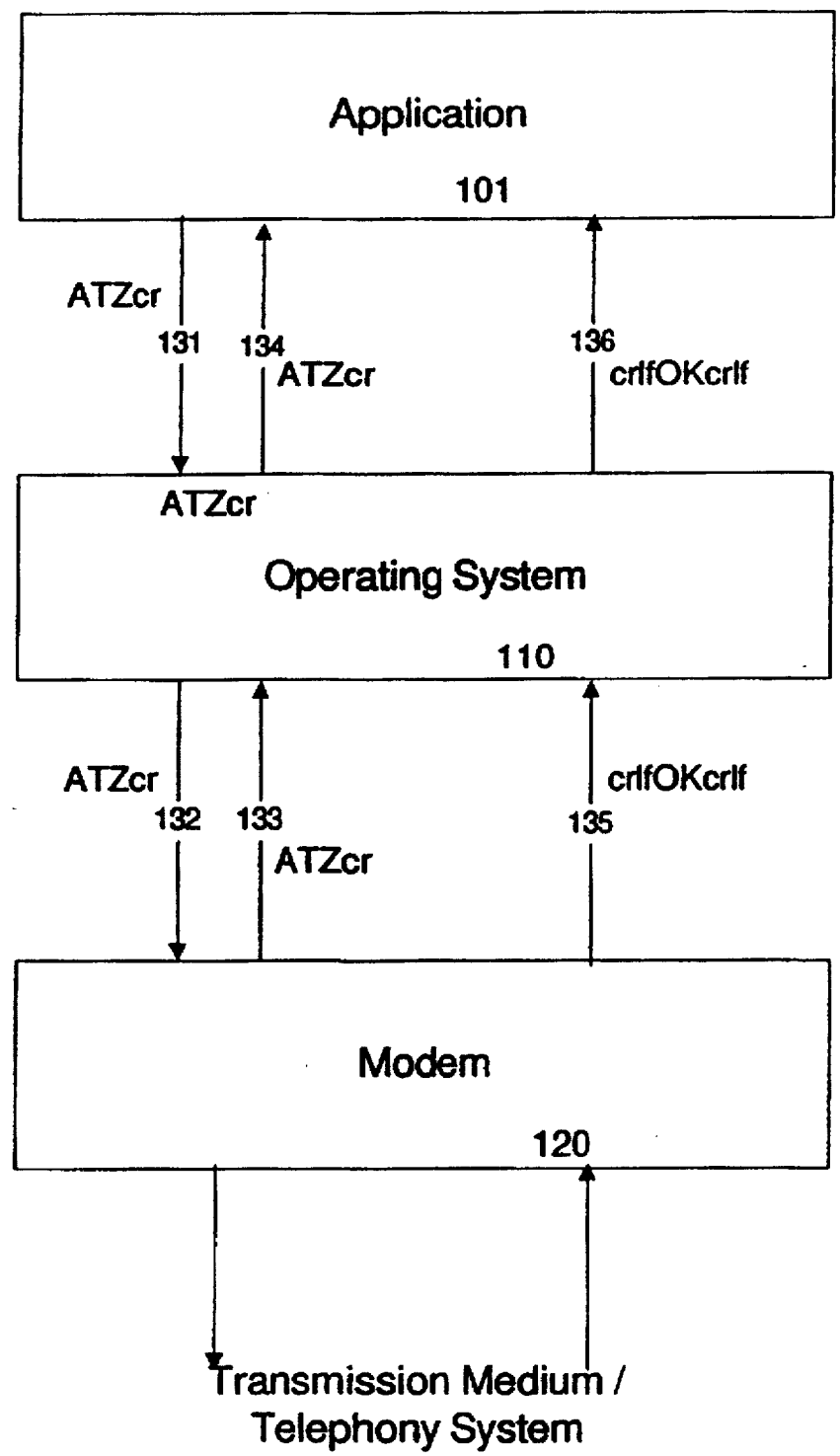
FIG. 2 depicts typical flows between the application program and the modem necessary to reset the modem.
Figure 3A:
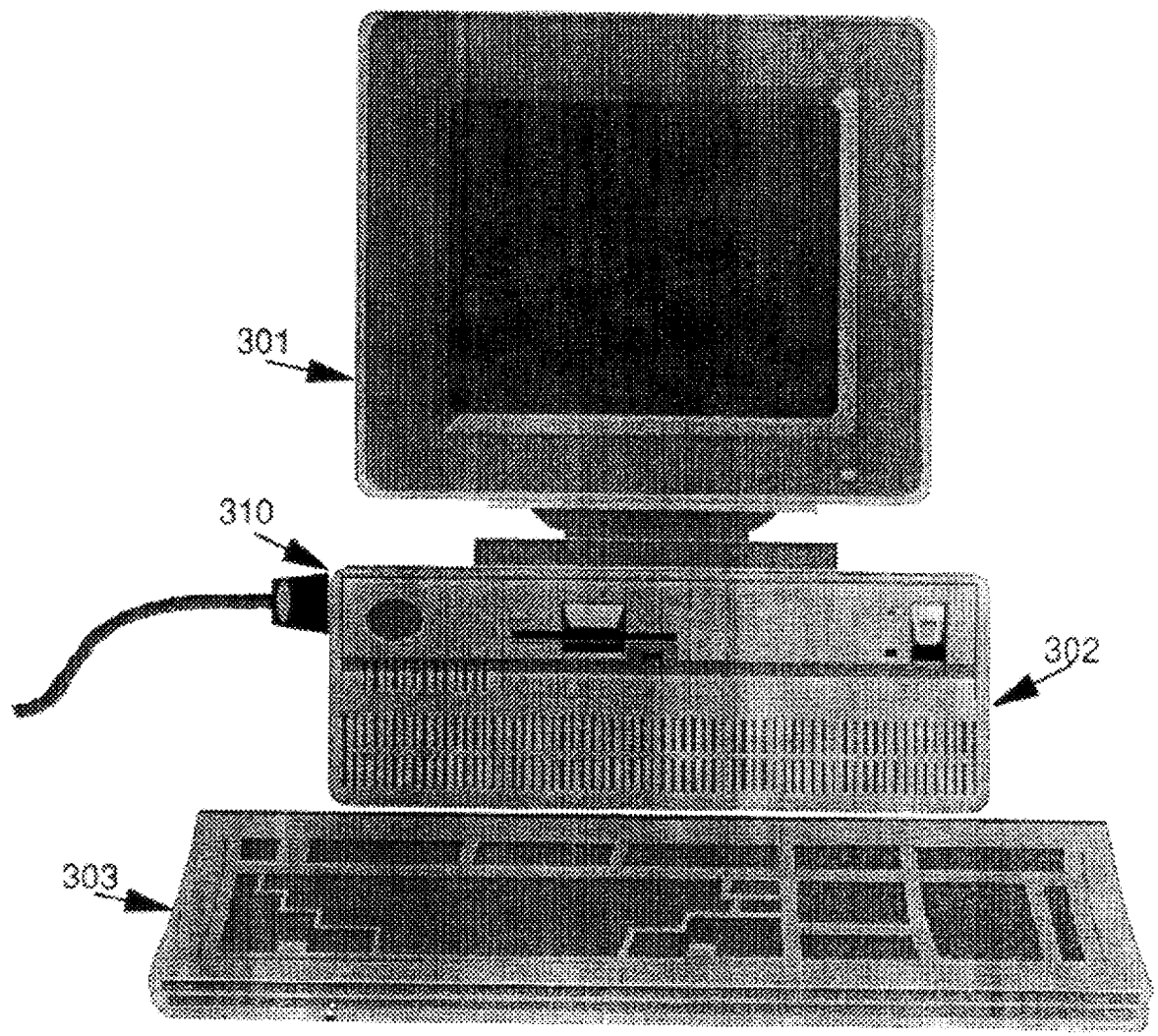
FIG. 3(a) shows a typical data processing device upon which the invention resides.

The hook program and application programs run on the operating system. The operating system runs on a data processing device or a computer. As shown in FIG. 3(a), the computer contains an output device, shown as a monitor 301, a processor unit 302 and an input device 303 which is shown as a keyboard. An interface adapter, here shown as a modem card 310, is inserted into the data processing device to allow the data processing device to communicate over the telephony system.

Figure 3B:
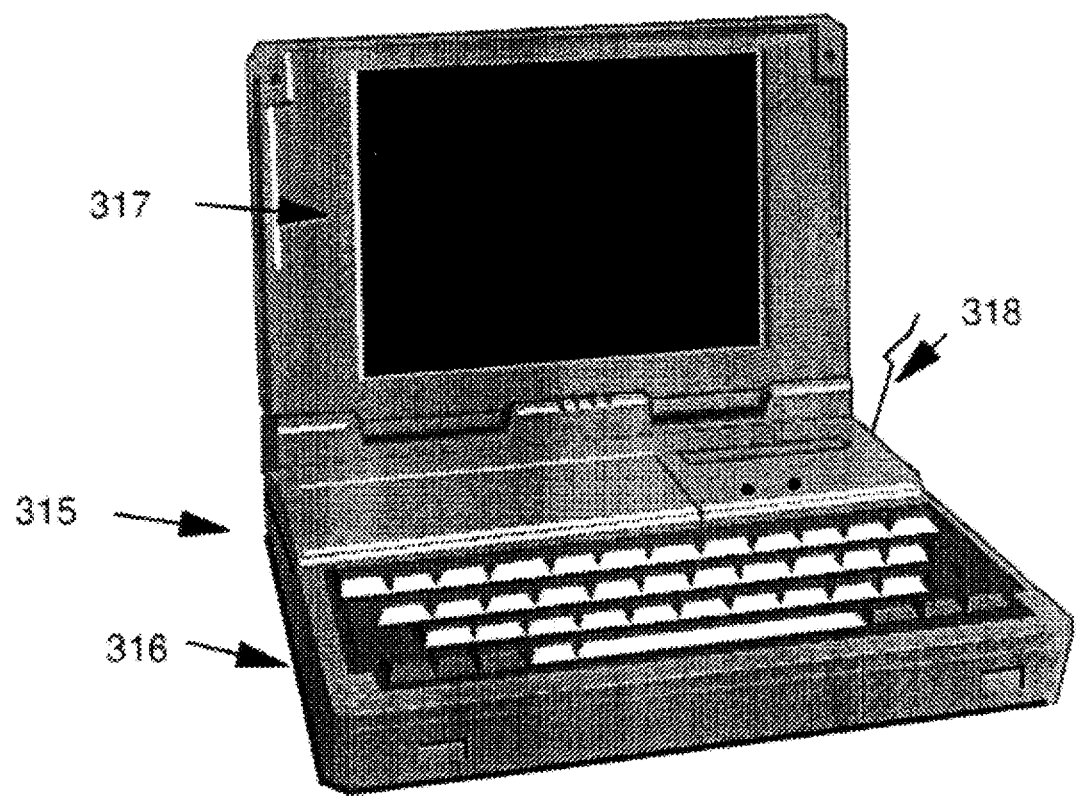
FIG. 3(b) is an alternative data processing device for demonstrating the invention.

An alternative configuration using a cellular connection is shown in FIG. 3(b). FIG. 3(b) shows a notebook computer 315 containing a keyboard 316 as an input device, a screen 317 as an output device and a wireless modem 318 to allow the data to be transmitted to the telephony system.

Figure 3C:
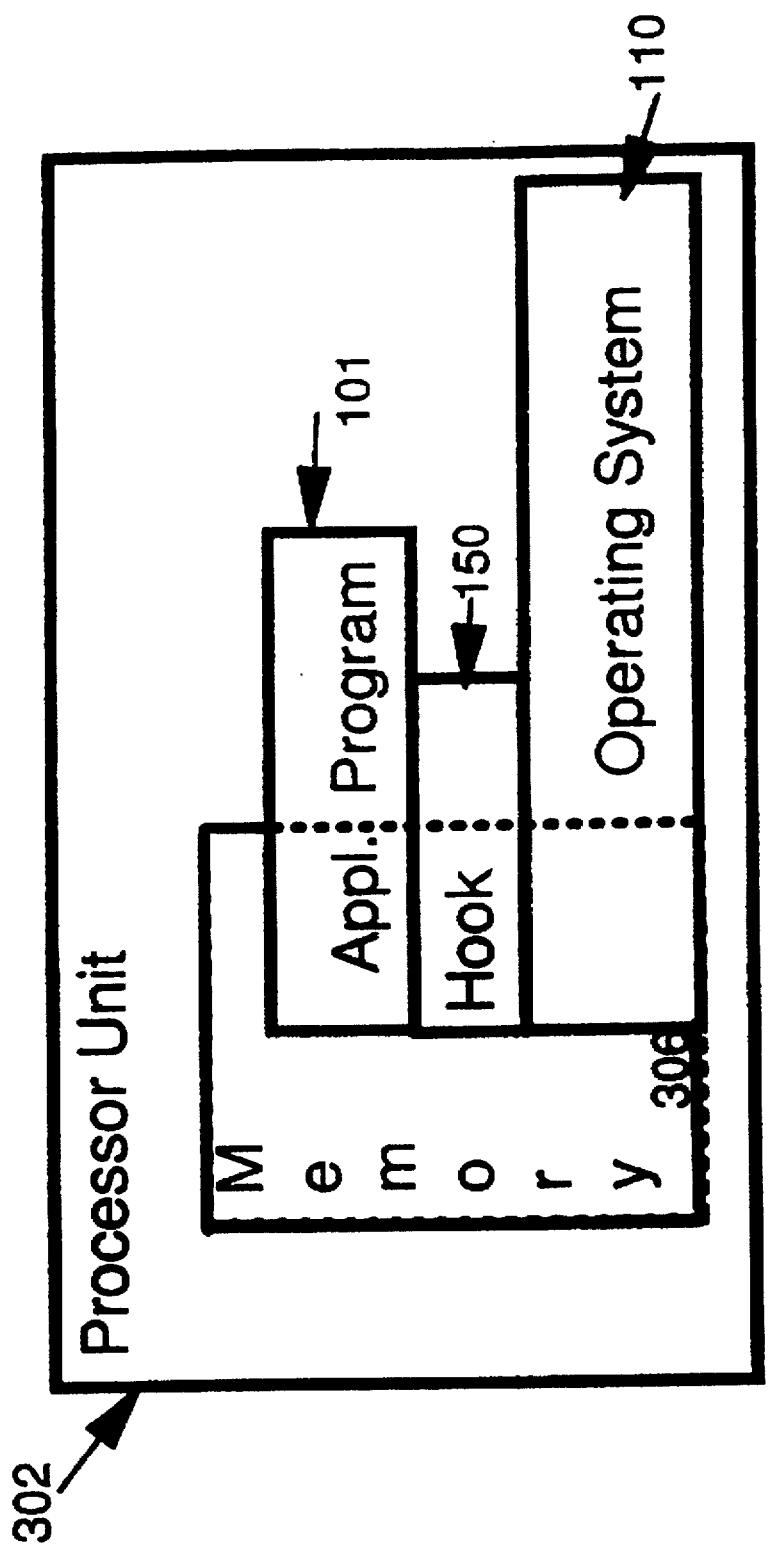
FIG. 3(c) is a logical representation of the internal workings of the data processing device.

As shown in FIG. 3(c), the processor unit 302 contains an operating system 110 and memory 306 on which the hook program 150 and the application programs 101 run.

The hook program, in the preferred embodiment, is driven by a finite state machine (FSM). The FSM contains the information necessary to issue the commands required to communicate with different types of modems as shown in the flow chart of FIG. 5. The hook program will buffer the operating system from information being sent by the application. It will also create responses to the application program that appear to have come from the operating system. This hook program is customized for the operating system on which it is running. In the preferred embodiment, the applications are running on Microsoft Windows (TM)[1] operating system although this invention is not meant to be limited in any way to this implementation. An example of how this hook program works is shown in FIGS. 4, 5 and 6.

Figure 4:
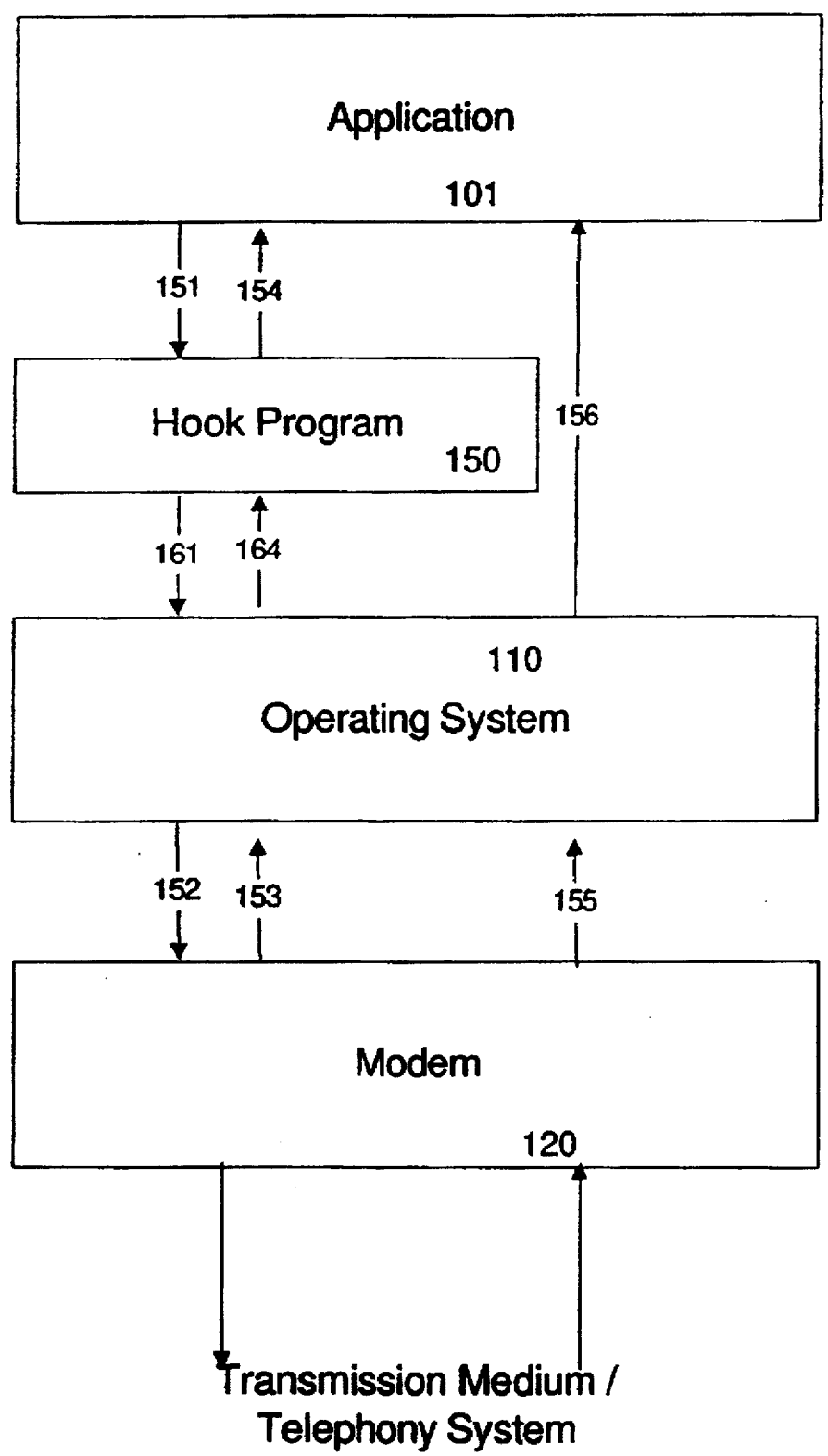
FIG. 4 demonstrates how a typical application program communicates with a modem using the hook program.

FIG. 4 demonstrates how a typical application program 101 communicates with the modem 120 by way of the operating system 110 and the hook program 150. The application program 101 sends data and/or modem commands 151 intended for the operating system 110. The data and/or modem commands 151 are intercepted by the hook program 150. The hook program 150 then sends modified data and/or modem commands 161 to the operating system 110, which sends the appropriate data and/or commands 152 to the modem 120 for transmission to the telephony system. The hook program 150 also echoes 154 the data and commands back to the application program 101. The modem 120 echoes the modified data and/or commands 153 back to the operating system 110 which echoes the information 164 back to the hook program 150. The hook program 150 interprets the information received 164 from the operating system 110 and, if necessary, sends any appropriate information 154 to the application program 110. When the hook program 150 sends information to the modem 120 that will generate interrupts, the interrupts 155/156 are sent from the modem 120, to the operating system 110, then directly to the application program 101. The interrupts 155/156 are not intercepted by the hook program 150. Examples of these "interrupt" events are 'data available' and 'lost connection'. These examples are not meant to limit the invention in any manner, they are provided merely Windows is a Trademark of the Microsoft Corporation. for explanation purposes. It would be obvious to one skilled in the art that any interrupt events would function similarly.

Figure 5:
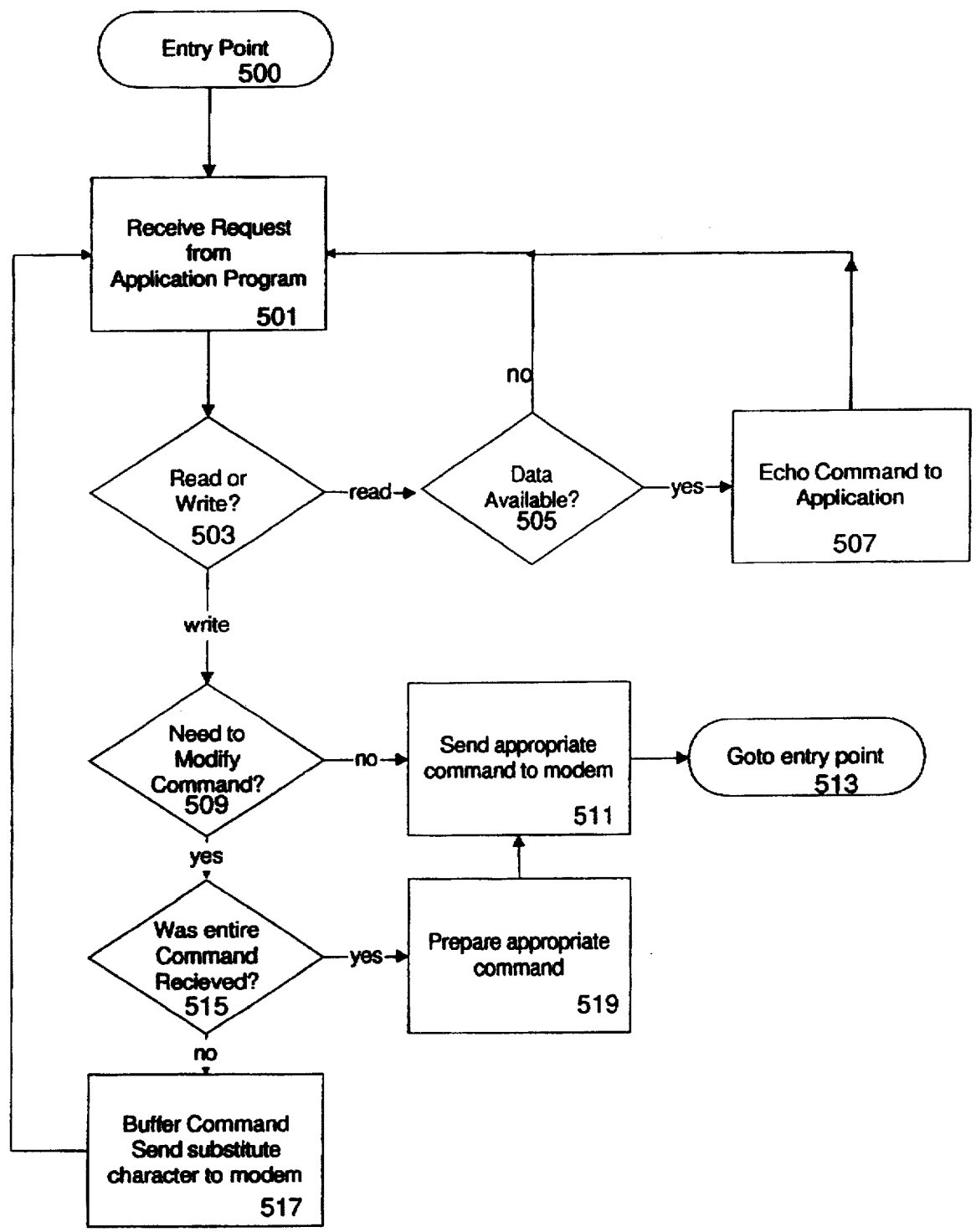
FIG. 5 is a flow chart representing functions of the hook program.
Figure 6:
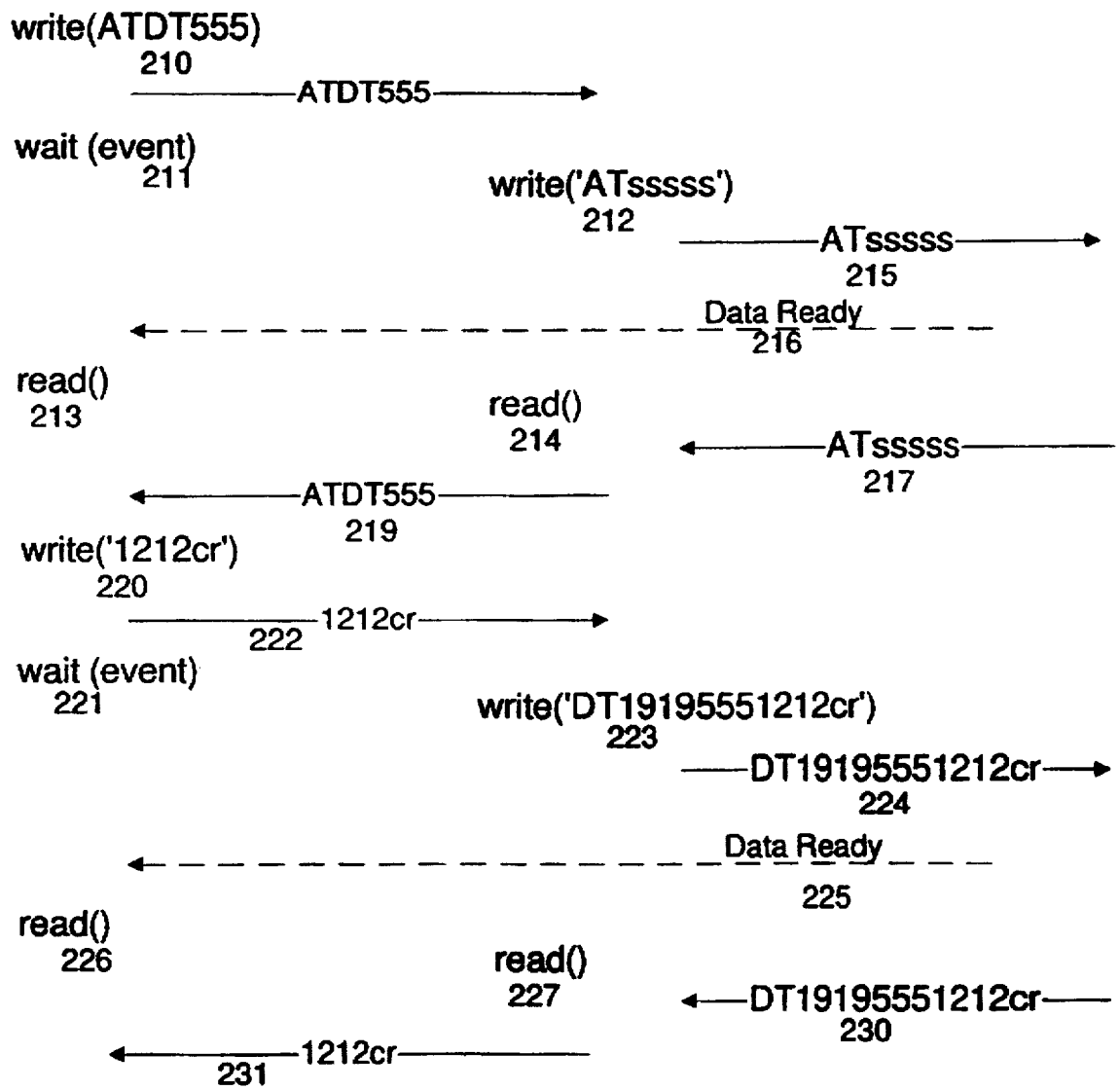
FIG. 6 demonstrates an example of command exchange using the hook program.

FIG. 5 is a flow chart showing some of the function within the hook program. Beginning at the entry point 500, the hook program receives requests from the applications program 501. A test is made 503 to determine whether the request is a read request or a write request. If it is a read request, a check is made 505 to determine whether there is data available to be read. If there is data available to be read, then the appropriate information is echoed 507 to the application program and the hook program returns to waiting to receive another request 501. If there was no data available at block 505, then the hook program returns to waiting to receive another request 501. If the request that was received from the application program was a write request, then a determination is made 509 as to whether the command requires modification. If the command does not require modification, then the appropriate command is sent to the modem 511 and the hook program waits to receive requests from the application program 501. If the command does require modification 515, then a test is made 515 to determine whether the whole command was received. If the whole command was received, then the appropriate command for transmission is generated 519 and it is sent to the modem 511 and the hook program, once again, waits to receive requests from the application program 501. If the whole command was not received, then the hook program buffers the command 517 and sends the appropriate substitute characters to the modem to generate the interrupts needed by the application program.

The importance of the function of the hook program becomes clear after realizing that many application programs are written to wait until receiving the echo of data or commands already sent before sending additional data and/or commands. Since the hook program is used to allow the application program to connect to many different types of communication medium using a single interface (for example the PSTN command set), the hook program must collect an entire command before determining what substitute command should be sent to the modem for the attached communication medium. As would be obvious to one skilled in the art, a hook program which functions in the above described manner will function properly for data, but will hold commands until they are complete. If the hook program holds the commands, the application program will not receive any interrupts generated from the modem echoing data and the application program may deadlock. The sending of substitute characters by the hook program to the modem solves this problem. The substitute characters are chosen so that they do not control the modem operation, other than merely generating interrupts. An example of this is shown in FIG. 6.

In FIG. 6, the application 201 issues a write command 210 consisting of an attention signal (AT), a dial indication (DT) and the beginning of a phone number (555) to the hook program 203. The application program 201 then waits 211 on an event to be posted. The hook program 203 receives the write 210 and, using the FSM, knows to issue 212 an attention signal (AT) and some harmless buffer characters represented by 'sssss' to the operating system 205 with directions to send it on to the modem. In the preferred embodiment, the harmless characters are actually a combination of blank indicators and backspace indicators although this does not suggest or imply limitation of the invention. The sending of this information 215 to the operating system 205 causes a data ready event 216 to be sent back to the application. This data ready 216 passes through the hook program 203 and is given directly to the application 201. When the application 201 receives the data ready indication 216 it issues a read command 213, which triggers the issuance of a read command 214 by the hook program 203. The operating system 205 then echoes the string sent 217 to it back to the hook program 203 which, once again using the FSM, assembles the response 219 that the application program 201 expects to hear and sends it to the application program 201. As is shown at item 220, the application 201 then issues another write command 220 and waits 221 on an event to be posted. The write command 220 includes the remainder of the phone number to be called and a carriage return (cr). This information 222 is sent to the hook program 203 which receives the information and, recognizing that the phone number has been completed, creates the command 223 to send to the operating system 205. The hook program 203 combines the dial indication, the phone number to be called and the carriage return, plus it inserts the area code into the number. This command 223, assembled by the hook program 203 is then sent 224 to the operating system 205. The command 224 sent to the operating system 205 causes a data ready 225 event to be posted back to the application 201. The posting of the data ready event 225 to the application program 201 causes the application program 201 to issue a read 226, which in turn causes the hook program 203 to issue a read 227, which triggers the echo transmission 230 from the operating system 205 to the hook program 203, which causes the hook program 203 to determine which characters the application program 201 is actually expecting and return these characters 231 to the application program 201.

The function of the hook program is extremely important in that, it must understand how much information must be sent to trigger the appropriate events in the modem, causing information to be sent back to the operating system and the application program. The hook program must also understand how to filter information to and from the application programs, and be prepared to provide the appropriate responses when required. This is accomplished by the FSM containing enough information to interpret the modem commands as they are being sent to the modem. Part of the interpretation of the modem commands is to realize which key strokes are to be echoed back to the display and when the display or sending program should be updated to reflect incoming information from the modem.

The present invention monitors the characters destined for the modem which are intercepted by the hook program looking for commands which require an entire string to be processed prior to action by the modem. If this kind of command is detected, substitute characters are sent to the modem. These substitute characters cause the modem to echo the substitute characters sent. These echoed characters cause the system to generate the required notification to the application, allowing the hook program to respond to the application request for echoed characters with the characters that the application is expecting. The hook program also absorbs or discards any unwanted, harmless data or command responses sent from the modem.

The invention allows the hook program to intercept the read and write operations (commands) without the requirement of handling the added complexity of notification when data from the modem is available to be read.

Figure 7A:
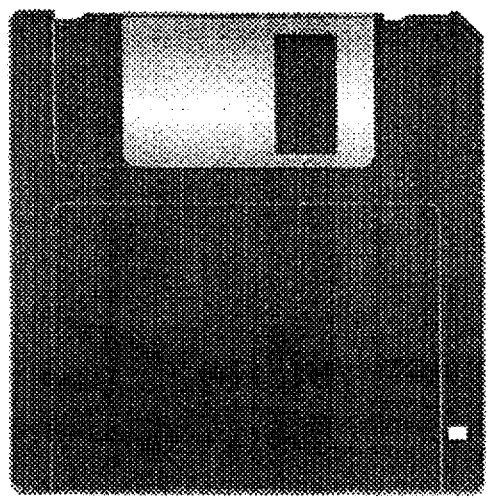
FIG. 7(a) shows an example of the media upon which the invention may reside.
Figure 7B:
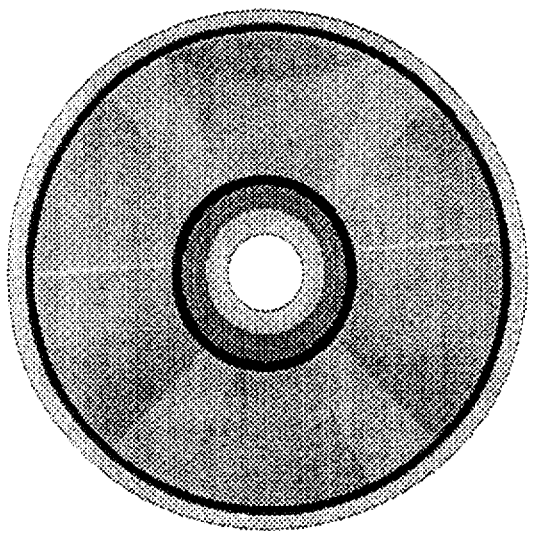
FIG. 7(b) shows an alternate example of the media upon which the invention may reside.

FIGS. 7(a) and 7(b) represent a diskette and a CD respectively. Both of the above figures are examples of media upon which the invention can be placed for distribution to others. This is not meant to limit distribution in any way, but is merely meant to demonstrate examples of how the invention might be packaged for distribution.

We claim:

1. A telecommunications system comprising:

a data processing device;

operating system running on said data processing device;

a transport mechanism;

an interface device between said operating system and said transport mechanism;

one or more applications programs running on the data processing device under the control of said operating system issuing commands to control said interface device; and, a hook program situated between said operating system and said one or more applications programs, said hook program intercepting commands sent from said one or more applications programs to said operating system, determining from said intercepted commands what information to send to said operating system to initiate a desired result, buffering said commands so that they can be displayed at a terminal for said data processing device, issuing appropriate commands by interpreting or altering the meaning of the commands to said operating system to generate immediate feedback to the user while buffering characters, commands, or sequences of commands until enough information is received to send a complete substitute command or sequences of substitute commands for transmission across the network; and allowing appropriate responses to be transmitted from said interface device to said one or more applications programs.

2. A telecommunications system as claimed in claim 1, wherein:
said responses transmitted from said interface device to said one or more application programs include data and interrupts; and,
said interrupts are passed directly from said interface device, through said operating system, to said one or more applications programs.

3. A telecommunications system as claimed in claim 1, wherein:
said interface device is a modem.

4. A telecommunications system as claimed in claim 1, wherein:
said hook program is implemented as one or more finite state machines.

5. A telecommunications system as claimed in claim 1, wherein:
said appropriate commands include harmless substitute characters which initiate interrupts from said interface device.

6. A system for connecting one or more applications programs to a transport mechanism, said system comprising:
one or more applications programs capable of sending commands to the transport mechanism;
an operating system upon which the one or more applications programs run;
a hardware interface to the transport mechanism; and,
a hook program, located between the one or more applications programs and The operating system wherein said hook program intercepts commands from the one or more application programs, interprets or alters said commands, sends information to the operating system to trigger desired responses from the hardware interface to the transport mechanism, wherein the return of events from the interface to the transport mechanism bypasses said hook program wherein said hook program issues appropriate commands to generate immediate feedback to the user while buffering characters, commands, or sequences of commands until enough information is received to send a complete substitute command or sequences of substitute commands for transmission across the network.

7. A method for connecting one or more applications programs to a transport mechanism, said method comprising:
inserting a hook program between an operating system, upon which said one or more applications programs and said hook program are executing, and said one or more applications programs;
said hook program intercepting information being sent from said one or more applications programs to said operating system;
communicating between said operating system and said transport mechanism by way of an interface device; and,
said hook program recognizing the characteristics of said transport mechanism by interpreting or altering received information; and issuing the appropriate commands to initialize or otherwise control said interface device to transmit data over said transport mechanism, wherein said hook program issues appropriate commands to generate immediate feedback to the user while buffering characters, commands, or sequences of commands until enough information is received to send a complete substitute command or sequences of substitute commands for transmission across the network.

8. A method as claimed in claim 7 wherein said interface device is a modem.

9. A method as claimed in claim 7 wherein interrupts from said interface device are transmitted directly to said one or more application programs, by-passing said hook program.

10. A method as claimed in claim 7, wherein said hook program is implemented as a finite state machine.

11. A method as claimed in claim 7, wherein said appropriate commands include harmless substitute characters which initiate interrupts from said interface device.

12. A computer program product for connecting one or more applications programs to a transmission medium by way of an interface device, the computer program product comprising:
a computer-readable storage medium having computer readable program code means embodied in said medium, said computer-readable program code means comprising
computer instruction means for transmitting information from the one or more application programs to and operating system running on a computer; and,
computer instruction means for intercepting the information being transmitted from the one or more applications programs to the operating system wherein the hook program transforms information sent from the one or more application programs to information that is required by the operating system to drive the interface device to cause the interface device to generate information for the applications programs, wherein said computer instruction means issues appropriate command to generate immediate feedback to the user while buffering characters, commands, or sequences of commands until enough information is received to send a complete substitute command or sequences of substitute commands for transmission across the network.

13. A computer program product according to claim 12, also comprising:
computer instruction means where said hook program intercepts data being transmitted from the operating system to the one or more application programs.

14. A computer program product according to claim 12 or 13, wherein:
interrupts are initiated by the interface device in response to the information sent by the one or more application programs; and,
computer instruction means where the interrupts are transmitted to the one or more application programs without passing through the hook program.

15. A computer program product according to claim 12 or 13 wherein said hook program is implemented as one or more finite state machines.

* * * * *